United States Patent
Wilhelmsson et al.

(10) Patent No.: US 9,560,651 B2
(45) Date of Patent: Jan. 31, 2017

(54) RADIO RESOURCE ALLOCATION OF UNLICENSED FREQUENCY BANDS

(71) Applicant: Telefonaktiebolaget L M Ericsson (publ), Stockholm (SE)

(72) Inventors: Leif Wilhelmsson, Dalby (SE); Jung-Fu Cheng, Fremont, CA (US); Havish Koorapaty, Saratoga, CA (US); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 66 days.

(21) Appl. No.: 14/287,612

(22) Filed: May 27, 2014

(65) Prior Publication Data

US 2015/0351095 A1   Dec. 3, 2015

(51) Int. Cl.
*H04W 4/00* (2009.01)
*H04W 72/04* (2009.01)
(Continued)

(52) U.S. Cl.
CPC ..... *H04W 72/0453* (2013.01); *H04W 72/0426* (2013.01); *H04W 72/082* (2013.01); *H04W 16/14* (2013.01)

(58) Field of Classification Search
None
See application file for complete search history.

(56) References Cited

U.S. PATENT DOCUMENTS

2013/0195073 A1*  8/2013  Chen ............... H04L 5/0023
                                                370/331
2014/0044105 A1   2/2014  Bontu et al.
2015/0163805 A1*  6/2015  Cattoni ........... H04W 72/0453
                                                370/329

FOREIGN PATENT DOCUMENTS

EP    2696530 A2   2/2014
WO    2012030677 A2   3/2012
(Continued)

OTHER PUBLICATIONS

IEEE, "IEEE Standard 802.11ac", IEEE Standard for Information technology—Telecommunications and information exchange between systems Local and Metropolitan area networks—Specific requirements. Part 11: Wireless LAN Medium Access Control (MAC) and Physical Layer (PHY) Specifications. 2013, 1-425.
(Continued)

*Primary Examiner* — Chi H Pham
*Assistant Examiner* — Fahmida Chowdhury
(74) *Attorney, Agent, or Firm* — Murphy, Bilak & Homiller, PLLC

(57) ABSTRACT

A network node operates in accordance with a first radio access technology in a frequency band, wherein communication according to a second radio access technology may occupy one or more of the radio resources of the frequency band. A method comprises receiving a beacon signal associated with the second radio access technology and determining whether or not the beacon signal comprises information indicative of which of the radio resources of the frequency band are used as primary and secondary channels, respectively, in accordance with the second radio access technology. The method also comprises determining a communication activity rate of at least one of the radio resources of the frequency band and selecting one or more of the radio resources of the frequency band based on the determined communication activity rate, and allocating one or more of the selected radio resources to communication in accordance with the first radio access technology.

12 Claims, 4 Drawing Sheets

(51) Int. Cl.
*H04W 72/08* (2009.01)
*H04W 16/14* (2009.01)

(56) References Cited

FOREIGN PATENT DOCUMENTS

| | | |
|---|---|---|
| WO | 2012101481 A1 | 8/2012 |
| WO | 2013013409 A1 | 1/2013 |
| WO | 2013179095 A1 | 12/2013 |
| WO | 2014023458 A1 | 2/2014 |

OTHER PUBLICATIONS

IEEE, "IEEE Standard 802.11n", IEEE Standard for Information technology—Telecommunications and information exchange between systems—Local and metropolitan area networks—Specific Requirements. Part 11: Wireless LAN Medium Access Control (MAC) and Physical Layer (PHY) Specifications., Oct. 29, 2009, 1-536.

* cited by examiner

RADIO RESOURCE ALLOCATION OF UNLICENSED FREQUENCY BANDS

TECHNICAL FIELD

The present invention relates generally to the field of allocation of radio resources. More particularly, it relates to allocation of radio resources of a non-exclusively licensed (e.g. unlicensed) frequency band for communication in accordance with a first radio access technology when one or more of the radio resources of the frequency band may be occupied by communication according to a second radio access technology.

BACKGROUND

In a typical scenario (e.g. in a specific geographical area) the available radio communication spectrum is sub-divided into spectrum parts that are dedicated to communication and/or other activities subject to restrictions from a frequency allocation body (e.g. the International Telecommunication Union—ITU) and spectrum parts that are dedicated to communication and/or other activities not subject to such restrictions.

Example activities subject to these restrictions include cellular telecommunication (e.g. according to the Global System for Mobile communication (GSM) standard, the Universal Mobile Telecommunication Standard (UMTS), the UMTS Long Term Evolution (UMTS LTE) standard, or the UMTS LTE-Advanced (UMTS LTE-A) standard), radio astronomy, television, air traffic control, etc.

The spectrum parts that are not subject to these types of restrictions will be referred to herein as unlicensed frequency bands. The spectrum parts that are only partly subject to these types of restrictions will be referred to herein as non-exclusively licensed frequency bands. Example activities in unlicensed frequency bands include Wireless Local Area Network (WLAN) communication (e.g. based on the IEEE—Institute of Electrical and Electronics Engineers—802.11 standard), Bluetooth communication, cordless phone signaling, remote control signaling, etc. The Industrial, Scientific and Medical (ISM) radio bands are examples of unlicensed frequency bands.

Spectrum sharing for WLAN is typically achieved by dividing the total available bandwidth into a number of channels. The channels are typically partially overlapping and communication in adjacent channels will, thus, interfere with each other.

In the 2.4 GHz band, the channels are typically 20 MHz wide and up to 13 channels are defined. In a typical utilization, three non-overlapping channels are used in the 2.4 GHz band to avoid adjacent channel interference.

In the 5 GHz band, many more channels are available since the available bandwidth is much larger. However, with the development of IEEE 802.11n and IEEE 802.11ac, the potential bandwidth of each channel has been increased from 20 MHz to 40, 80, and even 160 MHz. Thus, the number of non-overlapping channels available may still be rather small, in particular when the wider channel bandwidths are used.

FIG. 1 schematically illustrates an available bandwidth 100 divided into eight channels 101-108 (e.g. of 20 MHz each). Depending on the particular choice of IEEE 802.11 application, channels of 20 MHz (e.g. 110, 115), 40 MHz (e.g. 120, 125), 80 MHz (130, 135) or 160 MHz (not shown) may be used.

In a typical WLAN deployment, the channel allocation to the access points may be such that the channels used by neighboring access points, as far as possible, are not overlapping. In practice, this is often achieved by aiming to maximize the distance between access points that use the same (and/or adjacent) channel(s).

Carrier Sense Multiple Access with Collision Avoidance (CSMA/CA) is typically used in WLAN systems to further lower the interference between WLAN devices. When CSMA/CA is employed, the channel to be used is first sensed (typically by performing suitable measurements), and a transmission is only initiated if the channel is declared free (i.e. un-used, also termed Idle). If the channel is declared occupied (i.e. already used, also termed Busy), the intended transmission is typically deferred until the channel is found to be Idle. The CSMA/CA approach may lead to time-sharing of a channel between two or more access points which are in range of one another and using the same or overlapping channels, which may lower the throughput of one or more of the access points.

Some WLAN systems (e.g. IEEE 802.11n and IEEE 802.11ac) define a structure where each channel is defined as a primary or secondary channel by the access point. The information regarding which channels are primary and secondary channels is broadcast by the access point in a beacon signal (which is typically sent periodically). In such a system, a WLAN station (STA) has to sense the primary channel of the access point and declare it to be Idle before it may access the channel, and the same applies to the secondary channel. However, if the secondary channel is Idle and the primary channel is Busy, the secondary channel still cannot be used. In the example of FIG. 1, channels 110, 125 and 130 may be primary channels, and channels 115, 120 and 135 may be respective secondary channels. Typically, the access point determines which channels are to be used as primary and secondary channels, respectively.

The unlicensed frequency bands are widely used by WLAN communication (e.g. 802.11n and 802.11ac). However, there are typically still a lot of available frequency resources in the unlicensed bands. It might be desirable to use such available frequency resources in the unlicensed frequency bands for cellular telecommunication (e.g. UMTS LTE). Introducing UMTS LTE-A operation in unlicensed bands would allow for more flexible use of the unlicensed bands, especially if WLAN access points (AP) cooperate with the network nodes of the cellular communication system.

Introduction of UMTS LTE-A communication in unlicensed bands may, for example, comprise using a licensed frequency band for a primary cell (PCell) of a carrier aggregation scheme and using the unlicensed frequency band for a secondary cell (SCell) of the carrier aggregation scheme. In this manner, a connection between the UMTS LTE-A network and a wireless communication device is still maintained via the PCell if the SCell is severely interfered (e.g. by WLAN or Bluetooth). Examples of carrier aggregation using unlicensed bands are disclosed in US 2013/0195073 A1 and US 2014/0044105 A1.

FIG. 2 illustrates an example scenario where a cellular communication 215 between a wireless communication device 210 and a network node 200 is taking place in the vicinity of two access points 220, 230 for WLAN communication. The WLAN communication uses unlicensed frequency resources, and may include the access points 220, 230 transmitting respective beacon signals 225, 235. The cellular communication 215 typically uses one or more licensed frequency bands, but may (alternatively or additionally) also use unlicensed frequency resources.

WLAN standards are primarily designed so that WLAN devices may smoothly coexist with other WLAN devices. Therefore, if UMTS LTE-A is employed in an unlicensed frequency band already used by WLAN, the performance for the WLAN system may be severely degraded. On the other hand, employing WLAN-type approaches (e.g. CSMA/CA) may be extraneous to, and inflict very strong restrictions on, UMTS LTE-A.

Therefore, there is a need for alternative approaches of deployment of UMTS LTE-A in an unlicensed or non-exclusively licensed band which may (potentially) be used by WLAN. Preferably, the approaches should enable high data rates in UMTS LTE-A while ensuring minimum (or at least acceptable) performance loss for WLAN.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide approaches of deployment of UMTS LTE-A (and/or other suitable radio access technologies) in a frequency band which may be used by WLAN (and/or other similar radio access technologies).

According to a first aspect, this is achieved by a method of a network node. The network node is adapted to operate in accordance with a first radio access technology for allocation of radio resources of a frequency band to communication in accordance with the first radio access technology, wherein communication according to a second radio access technology may occupy one or more of the radio resources of the frequency band.

The method comprises receiving a beacon signal associated with the second radio access technology, and determining whether or not the beacon signal comprises information indicative of which of the radio resources of the frequency band are used as primary and secondary channels, respectively, in accordance with the second radio access technology. The method also comprises determining a communication activity rate of at least one of the radio resources of the frequency band.

The method also comprises selecting one or more of the radio resources of the frequency band based on the determined activity rate, wherein (if the beacon signal comprises information indicative of which of the radio resources of the frequency band are used as primary and secondary channels) the selection is further based on the information, and allocating one or more of the selected radio resources to communication in accordance with the first radio access technology.

The determination may, for example, be achieved by reading information from the received beacon signal and/or by performing suitable measurements.

The communication activity rate may relate to communication activity in accordance with the first and/or second radio access technology.

The communication activity rate of a radio resource may, for example, comprise one or more of a traffic load of the radio resource, a number of users of the radio resource, and whether or not the radio resource is currently used for communication.

In some embodiments, selecting one or more of the radio resources of the frequency band may be additionally based on other parameters and/or information.

According to some embodiments, the allocated radio resources may be used for communication in accordance with the first radio access technology.

The radio resources may, for example, comprise frequency resources (e.g. WLAN channels). The radio resources may, alternatively or additionally, comprise time resources.

In some embodiments, a secondary channel may be used in accordance with the second radio access technology only if both the secondary channel and a corresponding primary channel are determined to the un-used.

In some embodiments, selecting one or more of the radio resources may comprise (if the beacon signal comprises information indicative of which of the radio resources of the frequency band are used as primary and secondary channels) selecting a radio resource used as secondary channel in accordance with the second radio access technology over a radio resource used as primary channel in accordance with the second radio access technology.

According to some embodiments, selecting one or more of the radio resources may comprise selecting a radio resource determined not to be currently used over a radio resource determined to be currently used.

According to some embodiments, selecting one or more of the radio resources may comprise selecting a first radio resource over a second radio resource if a traffic load of the first radio resource is lower than a traffic load of the second radio resource.

According to some embodiments, selecting one or more of the radio resources may comprise selecting a first radio resource over a second radio resource if a number of users of the first radio resource is lower than a number of users of the second radio resource.

Various combinations of the above selection approaches may also be applied according to some embodiments.

The first radio access technology may apply carrier aggregation according to some embodiments, and the allocated radio resources of the frequency band may be for secondary cell communication of the carrier aggregation.

In some embodiments, the first radio access technology may be according to the Evolved Universal Terrestrial Radio Access—E-UTRA—(also referred to herein as the Universal Mobile Telecommunication Standard, Long Term Evolution (UMTS-LTE) and/or Universal Mobile Telecommunication Standard, Long Term Evolution Advanced (UMTS-LTE-A)). Alternatively, the first radio access technology may be according to any other known or future suitable cellular telecommunication standard.

In some embodiments, the second radio access technology may be according to the Institute of Electrical and Electronics Engineers (IEEE) 802.11 standard.

The method according to the first aspect may, for example, be performed in connection to one or more of the following events:

Communication in accordance with the first radio access technology is enabled in the frequency band (e.g. a carrier aggregation secondary cell is set up).

Communication in accordance with the first radio access technology is initiated in the frequency band.

Periodically (e.g. at an interval of a 1-10 seconds) during usage of the frequency band for communication in accordance with the first radio access technology.

According to some embodiments, the frequency band may be one of an unlicensed frequency band and a non-exclusively licensed frequency band.

A second aspect is a computer program product comprising a computer readable medium, having thereon a computer program comprising program instructions, the computer program being loadable into a data-processing unit and adapted to cause execution of the method according to the first aspect when the computer program is run by the data-processing unit.

A third aspect is a scheduler for a network node adapted to operate in accordance with a first radio access technology. The scheduler is for allocation of radio resources of a frequency band to communication in accordance with the first radio access technology, wherein communication according to a second radio access technology may occupy one or more of the radio resources of the frequency band.

The scheduler is adapted to determine whether or not a received beacon signal associated with the second radio access technology comprises information indicative of which of the radio resources of the frequency band are used as primary and secondary channels, respectively, in accordance with the second radio access technology. The scheduler is also adapted to determine a communication activity rate of at least one of the radio resources of the frequency band.

The scheduler is also adapted to select one or more of the radio resources of the frequency band based on the determined activity rate, wherein (if the beacon signal comprises information indicative of which of the radio resources of the frequency band are used as primary and secondary channels) the selection is further based on the information, and allocate one or more of the selected radio resources to communication in accordance with the first radio access technology.

According to some embodiments, the scheduler may comprise a determiner, a selector and an allocator.

The determiner may be adapted to perform the determination of whether or not a received beacon signal associated with the second radio access technology comprises information indicative of which of the radio resources of the frequency band are used as primary and secondary channels, respectively, in accordance with the second radio access technology.

The selector may be adapted to perform the selection of one or more of the radio resources of the frequency band.

The allocator may be adapted to perform the allocation of one or more of the selected radio resources to communication in accordance with the first radio access technology.

A fourth aspect is a network node comprising the scheduler according to the third aspect.

In some embodiments, the third and fourth aspects may additionally have features identical with or corresponding to any of the various features as explained above for the first aspect.

An advantage of some embodiments is that alternative approaches are provided for deployment of UMTS LTE-A in a frequency band which may be used by WLAN (e.g. IEEE 802.11).

Another advantage of some embodiments is that reasonably high data rates are enabled for UMTS LTE-A while acceptable performance loss is ensured for WLAN.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where co-existence in an unlicensed frequency band of communication according to a first and second radio access technology is facilitated. The unlicensed frequency band will be used as an illustrative example. It should be noted, however, that embodiments may be equally applicable to other scenarios with a frequency band where a second radio access technology may already be operating.

Embodiments use an approach where allocation of radio resources of the unlicensed frequency band to communication in accordance with the first radio access technology is based on knowledge of whether and/or how the radio resources are used by communication in accordance with the second radio access technology.

Throughout the description, UMTS LTE-A will be used as a non-limiting example of the first radio access technology and WLAN will be used as a non-limiting example of the second radio access technology.

Thus, some embodiments provide means to deploy UMTS LTE-A in an unlicensed frequency band and allow UMTS LTE-A to significantly use the radio resources of the unlicensed frequency band, while the consequential negative impact on WLAN is minimized or at least kept at a reasonably low level.

Figure 2:
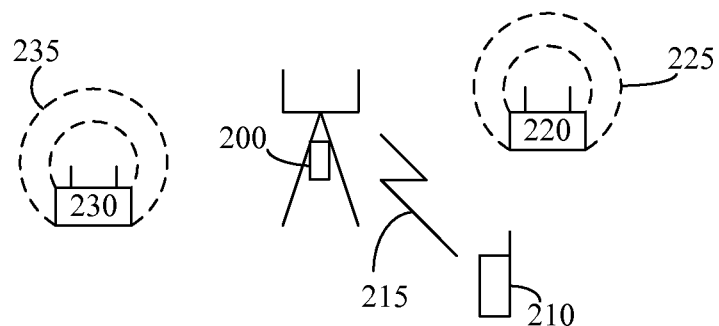
FIG. 2 is a schematic drawing illustrating an example scenario where some embodiments may be applicable.
Figure 3:
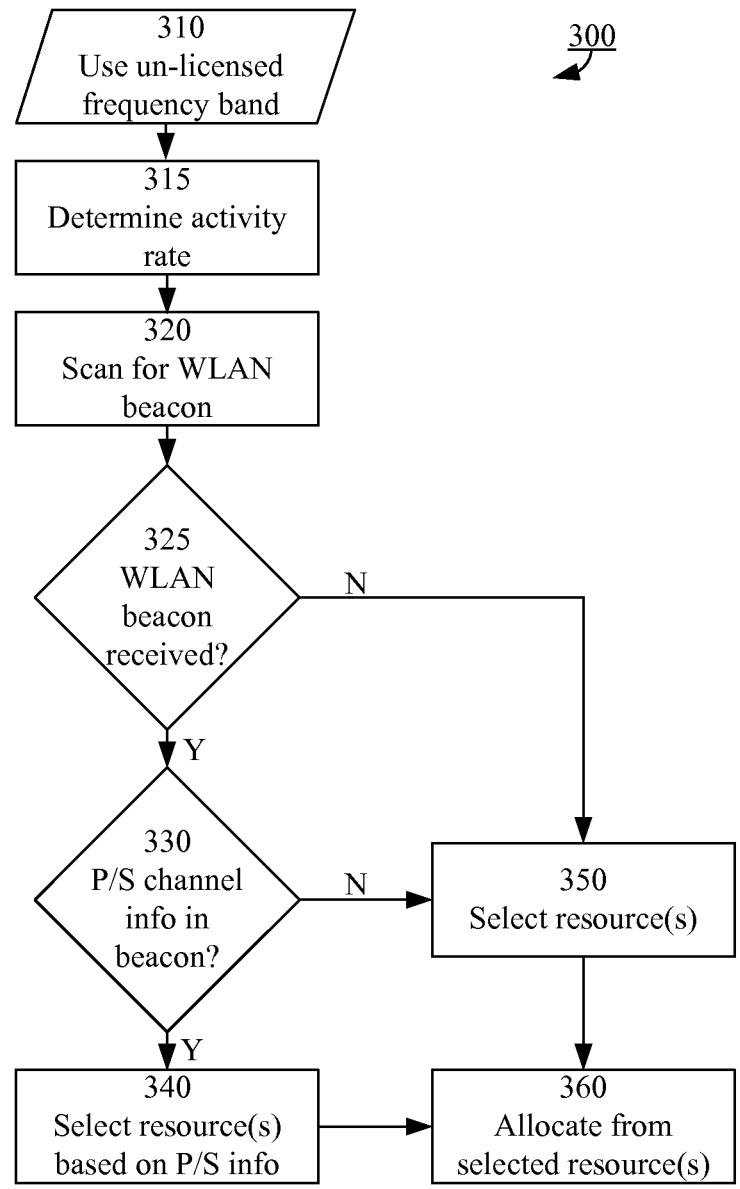
FIG. 3 is a flowchart illustrating example method steps according to some embodiments.

FIG. 3 illustrates an example method 300 according to some embodiments. The example method 300 may, for example, be performed by the network node 200 of FIG. 2.

The method starts in step 310, where it is determined to (potentially) use an unlicensed frequency band—which may be, at least partly, occupied by WLAN communication—for UMTS LTE-A communication.

An activity rate of communication in the unlicensed frequency band is determined in step 315. The communication activity rate may, for example, be achieved by reading information from the received beacon signal and/or by performing suitable measurements.

The activity rate could be of WLAN communication and/or of UMTS LTE-A communication. It may be determined per WLAN channel and/or by potential UMTS LTE-A channel. The activity rate may, for example, comprise one or more of a number of users, an average data rate per user, a total data rate, a traffic load, whether or not the channel is free (i.e. un-used), etc.

In step 320, a scan for WLAN beacon signals is performed and a WLAN beacon signal may be received accordingly. The WLAN beacon signal may, for example, be transmitted from a WLAN access point such as any of the access points 220 and 230 of FIG. 2.

Step 320 may comprise receiving more than one WLAN beacon signal (e.g. from two or more access points) in some embodiments.

Step 320 may be performed after, before, or in parallel to step 315.

If no WLAN beacon signal is received in step 320 (N-path out from step 325), the process continues directly to step 350.

If at least one WLAN beacon signal is received in step 320 (Y-path out from step 325), the process continues to step 330 where it is determined whether or not the received WLAN beacon signal(s) comprises information that indicates which of the WLAN channels of the unlicensed frequency band are used as primary and secondary channels, respectively.

If such information is comprised in the beacon signal (Y-path out from step 330), the information is used together with the determined activity rate (and possibly also other parameters) in step 340 to select one or more of the WLAN channels for potential UMTS LTE-A communication.

For example, a WLAN secondary channel may be selected over a WLAN primary channel. If more than one WLAN beacon signal is received in step 320, a WLAN channel indicated as a secondary channel by all of the received beacon signals may be preferred in the selection.

The different parameters (various activity rate parameters and primary/secondary WLAN channel information) may be given the same or different weight in the selection process of step 340.

In some examples, each channel may be given a score value based on the parameters, and the total score value for each channel is used to perform the selection. For example, a channel may get score_p/s=1 if it is a secondary channel and score_p/s=0 if it is a primary channel, score_used=2 if it is un-used and score_used=0 if it is used, score_load=[0 . . . 1] depending on the traffic load and score nbr=[0 . . . 1] depending on the number of users. Then the total score of a channel is the sum of the scores for each parameter, and the channel with the highest score may be selected.

In some examples, a secondary channel which is un-used is selected if such a channel exists. If no such channel exists, a primary channel which is un-used may be selected. Only if no such channel exists either, one or more of the traffic load and number of users of a channel may be considered (possibly in combination with the information indicating primary/secondary channel) in the selection process according to some of these examples.

If information indicating which channels are used as primary and secondary channels is not comprised in the beacon signal (N-path out from step 330), selection of one or more of the WLAN channels for potential UMTS LTE-A communication is performed based on the determined activity rate and possibly other conditions in step 350. Some examples of such a selection may be deduced from the description of step 340 by disregarding the information indicating primary/secondary channel.

One example of an activity rate parameter of a channel is the number of WLAN stations (STA) currently using the channel. If this parameter is used as metric in the channel selection, the channel with the smallest number of STAs may be chosen, for example.

Another example of an activity rate parameter of a channel is the load (e.g. defined as how large percentage of the time the channel is used). If this parameter is used as metric in the channel selection, the channel with the lowest load may be chosen, for example.

According to some examples, both parameters (the number of STAs and the load) may be used to form a metric for the channel selection.

In some scenarios, it may happen that no channel deemed suitable according to the applied metric and condition is found. For example, if no channel is found which is used by less than 10 (or any other applicable number) STAs and/or if no channel is found with less than 60% (or any other applicable number) load, it may be determined that it is not possible to use any channel of the unlicensed frequency band without significantly reducing the performance for WLAN.

In step 360, one or more of the selected WLAN channels (of step 340 or step 350, as applicable) are allocated for UMTS LTE-A communication.

The allocated WLAN channel(s) may then be used for UMTS LTE-A communication in any suitable manner. For example, the allocated WLAN channel(s) may be used for a carrier aggregation secondary cell.

In some embodiments, the selection and allocation may be performed in a single process. In such embodiments, step 360 may be merged into steps 340 and 350, respectively.

The selection and/or allocation (steps 340, 350, 360) may, according to some examples, comprise selecting and allocating time resources to UMTS LTE-A in addition to frequency resources such as WLAN channels.

For example, it may be determined to what extent a WLAN channel should be occupied (i.e. a percentage of time) by UMTS LTE-A and how long consecutive time intervals should be used by UMTS LTE-A.

Such determinations may be based on similar considerations as described above for steps 340 and 350. Typically, an un-used channel could be used at a relatively high percentage and/or during relatively long consecutive time intervals compared to an already used channel. Similarly, a secondary channel could be used at a relatively high percentage and/or during relatively long consecutive time intervals compared to primary channel. A channel with low traffic load and/or a low number of users could be used at a relatively high percentage and/or during relatively long consecutive time intervals compared to a channel with high traffic load and/or a high number of users.

In one example the extent to which a channel is used by UMTS LTE-A is limited to a (possibly predetermined) fraction of 1. The fraction may be expressed in terms of a function depending on the number of WLAN users of the channel. The function may be a non-increasing function of the number of WLAN users of the channel.

Another example is as follows. Because the channel access in WLAN is based on CSMA/CA, the efficiency decreases with an increased number of STAs associated with the AP. The UMTS LTE-A may therefore limit the usage of the channel such that the total load does not exceed (90-NrOfSTAs) %, where NrOfSTAs is the number of STAs associated with the AP. That is, if 10 STAs are associated with the AP and the current load is, say 60%, then UMTS LTE-A may use the channel 20% of the time, if the total load should not exceed 80%. On the other hand, if the current load is 60% and the number of STAs associated with the AP is 30 or more, then UMTS LTE-A may choose not to use the channel at all.

Figure 4:
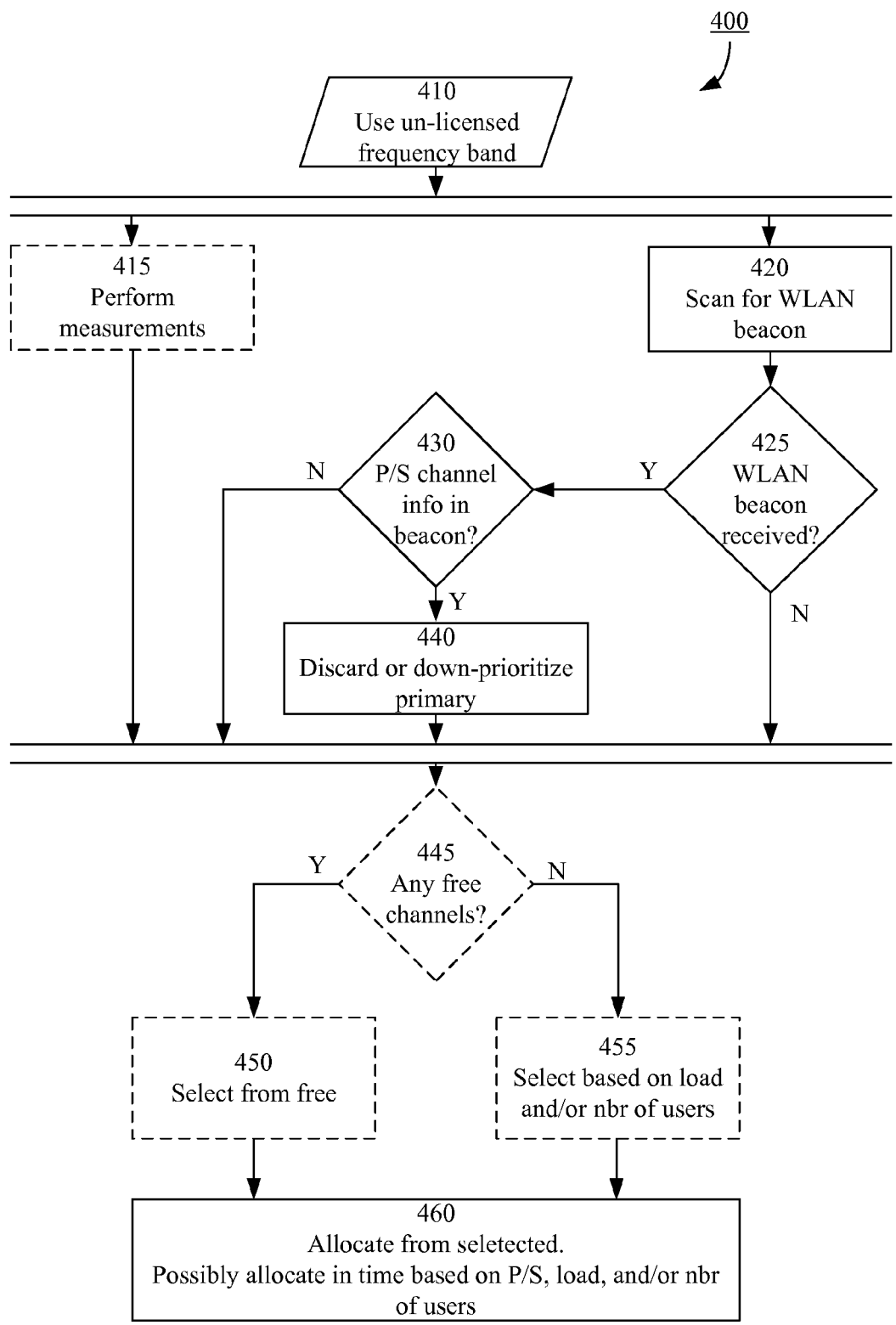
FIG. 4 is a flowchart illustrating example method steps according to some embodiments.

FIG. 4 also illustrates an example method 400 according to some embodiments. The example method 400 may, for example, be performed by the network node 200 of FIG. 2.

The method starts in step 410, where it is determined to (potentially) use an unlicensed frequency band—which may be, at least partly, occupied by WLAN communication—for UMTS LTE-A communication (compare with step 310 of FIG. 3).

In step 420, a scan for WLAN beacon signals is performed and a WLAN beacon signal may be received accordingly (compare with step 320 of FIG. 3). The WLAN beacon signal may, for example, be transmitted from a WLAN access point such as any of the access points 220 and 230 of FIG. 2.

In a parallel (optional and/or alternative) step 415, measurements are performed for determining communication activity rates (e.g. traffic load, number of users, un-used channel, etc), e.g. if such information is not already implied by the content of the beacon signal and/or if no beacon signal is received (compare with step 315 of FIG. 3). Step 415 is illustrated in FIG. 4 as performed in parallel to step 420. However, step 415 may be performed before or after step 420 in other examples. Step 415 may even be performed just before any of steps 445 and 455 in some examples.

If no WLAN beacon signal is received in step 420 (N-path out from step 425), the process continues directly to step 445.

If at least one WLAN beacon signal is received in step 420 (Y-path out from step 425), the process continues to step 430 where it is determined whether or not the received WLAN beacon signal(s) comprises information that indicates which of the WLAN channels of the unlicensed frequency band are used as primary and secondary channels, respectively (compare with step 330 of FIG. 3).

If such information is comprised in the beacon signal (Y-path out from step 430) the information is used as one parameter to select one or more of the WLAN channels for potential UMTS LTE-A communication. This is manifested in step 440 where primary channels are either down-prioritized (e.g. given a low score value) or completely discarded from the selection process.

If information indicating which channels are used as primary and secondary channels is not comprised in the beacon signal (N-path out from step 430) the process continues directly to optional step 445.

In step 445, it is determined whether or not there are any free (i.e. un-used) channels among the WLAN channels remaining for selection. This determination may be based on results from step 415 and/or on information comprised in received WLAN beacons.

If there are free remaining channels (Y-path out from step 445), one or more of them are selected in step 450.

If all primary channels were discarded in step 440, step 450 results in one or more selected channels that are free and secondary. In this case, a primary channel is not selected even if it is free; that case will lead to the N-path out of step 445.

If the primary channels were down-prioritized in step 440, step 450 results in one or more selected channels that are free and secondary if such channels exist, otherwise step 450 results in one or more selected channels that are free and primary if such channels exist.

If there are no free remaining channels (N-path out from step 445), the channel selection in step 455 is based on traffic load and/or number of users of each remaining channel. The traffic load and/or number of users may have been derived in step 415 and/or from information comprised in received WLAN beacons.

For example, a channel with low traffic load and/or a low number of users could be selected over a channel which high traffic load and/or a high number of users.

In step 460, one or more of the selected WLAN channels (of step 440, step 450 or step 455 as applicable) are allocated for UMTS LTE-A communication.

The allocated WLAN channel(s) may then be used for UMTS LTE-A communication in any suitable manner. For example, the allocated WLAN channel(s) may be used for a carrier aggregation secondary cell.

In some embodiments, the selection and allocation may be performed in a single process. In such embodiments, step 460 may be merged into steps 440, 450 and 455, respectively.

The allocation of step 460 may, according to some examples, comprise allocating time resources to UMTS LTE-A in addition to frequency resources such as WLAN channels (compare with the description in connection to step 360 of FIG. 3).

Figure 5:
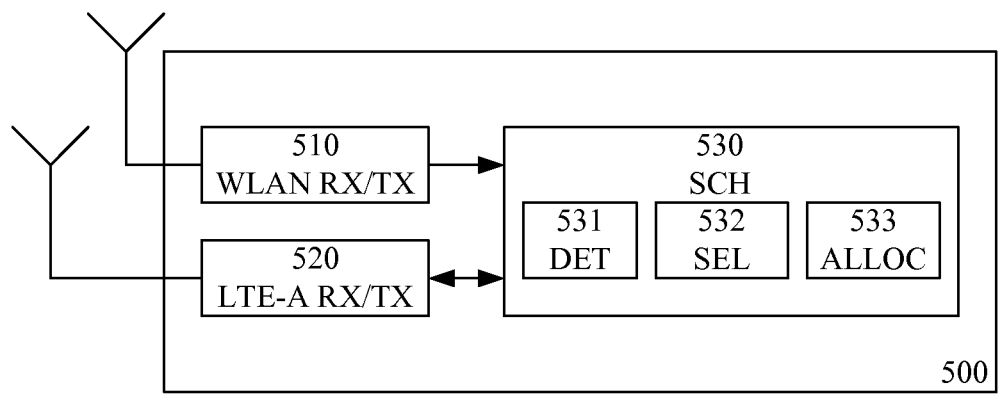
FIG. 5 is a block diagram illustrating an example arrangement according to some embodiments.

FIG. 5 schematically illustrates an example arrangement 500 according to some embodiments. The example arrangement 500 may, for example, be comprised in a network node (e.g. the network node 200 or FIG. 2). Alternatively or additionally, the example arrangement 500 may, for example, be adapted to perform the method according to any of the FIGS. 3 and 4.

The arrangement comprises a scheduler (SCH) 530, a UMTS LTE-A transceiver (LTE-A RX/TX) 520 and a WLAN transceiver (WLAN RX/TX) 510.

The WLAN transceiver 510 may be implemented as a separate unit as illustrated in FIG. 5 or may be integrated in the UMTS LTE-A transceiver 520. The WLAN transceiver 510 may be adapted to perform all or only some of the conventional WLAN transmissions and receptions. At least, the WLAN transceiver is adapted to receive a WLAN beacon signal (compare with steps 320 and 420 of FIGS. 3 and 4, respectively).

The scheduler 530 is adapted to allocate of radio resources of an unlicensed frequency band—which may be, at least partly, occupied by WLAN communication—for UMTS LTE-A communication.

To this end, the scheduler 530 is adapted to determine whether or not a WLAN beacon signal received by the WLAN transceiver 510 comprises information indicative of which of the WLAN channels of the unlicensed frequency band are used as primary and secondary channels, respectively (compare with steps 330 and 430 of FIGS. 3 and 4, respectively). The scheduler 530 is also adapted to select one or more of the WLAN channels of the unlicensed frequency band (compare with steps 340, 350, 440, 450 and 455 of FIGS. 3 and 4, respectively), and allocate one or more of the selected WLAN channels to UMTS-LTE communication (compare with steps 360 and 460 of FIGS. 3 and 4, respectively).

The selection of WLAN channels by the scheduler 530 may, for example, use any of the principles described in connection with FIGS. 2 and 3. For example, the scheduler 530 may be adapted to perform that selection based on a determined activity rate and (responsive to determining that the beacon signal comprises the information indicative of primary and secondary channels) based on that information.

In the example of FIG. 5, the scheduler 530 comprises a determiner (DET) 531, a selector (SEL) 532 and an allocator (ALLOC) 533.

The determiner 531 is adapted to perform the determination of whether or not the received beacon signal associated with the second radio access technology comprises information indicative of primary and secondary channels. The determiner may also be adapted to determine a communication activity rate of the frequency band (compare with steps 315, 415, 445 of FIGS. 3 and 4).

The selector 532 is adapted to perform the selection of one or more of the WLAN channels of the unlicensed frequency band.

The allocator 533 is adapted to perform the allocation of one or more of the selected WLAN channels to UMTS LTE-A communication.

In the examples above, the application of parameters (secondary/primary, traffic load, number of users, un-used/used) and the corresponding selection and allocation has been described as performed per WLAN channel. It should be noted, however, that (alternatively or additionally) parameters, selection and/or allocation may be considered per potential UMTS LTE-A channel.

Some illustrative examples and scenarios will now be described where one or more embodiments of the invention may be applicable. Numerous variations may be easily envisioned, and the following is only intended as illustrations.

In one scenario, it may be desirable to increase UMTS LTE-A capabilities by adding a secondary cell (SCell) with a bandwidth of 20 MHz in an un-licensed frequency band at 5 GHz (where WLAN is potentially already operating) to the already existing primary cell (PCell) of a licensed frequency band.

The establishment of the SCell may comprise searching for a 20 MHz channel span in the unlicensed frequency band where no WLAN channels are used, and—if found—allocating the channel span to UMTS LTE-A communication (compare, e.g. with steps 445 and 450 of FIG. 4).

If several possible 20 MHz channel spans are found, the allocation to UMTS LTE-A communication is preferably done for a 20 MHz channel span having less primary WLAN channels than the other possible 20 MHz channel spans.

Generally, UMTS LTE-A allocation using WLAN primary channels may be avoided as far as possible according to many embodiments disclosed herein.

Figure 1:
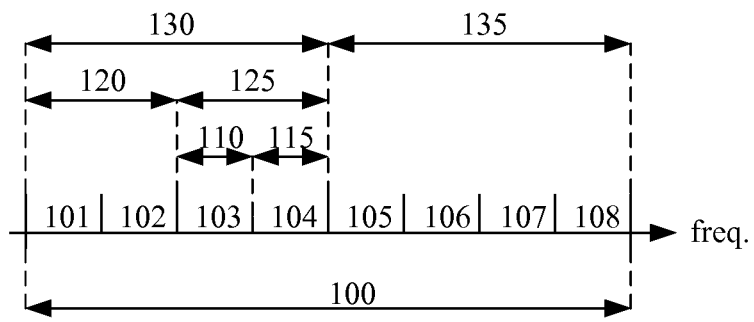
FIG. 1 is a schematic drawing illustrating an example primary and secondary channel structure.

However, in situations with dense WLAN deployments (in particular in situations when wide bandwidth WLAN channels are employed, compare with 120, 125, 130, 135 of FIG. 1) it is not likely that a 20 MHz channel is found which is completely free from WLAN communication.

In such cases, the communication activity rate on the different potential UMTS LTE-A channels may be determined and used to supplement the selection and allocation of UMTS LTE-A channels.

According to one example, the following steps may be performed:
- Determining the traffic load of the channel (e.g. percentage of time the channel is used) and the number of users of the channel.
- Determining, based on the knowledge of the communication activities (e.g. load and number of users) on the channel, which channel should be used for UMTS LTE-A. Preferably, a channel is selected which gives the best (or acceptable) UMTS LTE-A performance while minimizing (or keeping at an acceptable level) the negative impact on WLAN.
- Imposing suitable restrictions on the UMTS LTE-A communication to ensure that the negative impact on WLAN is kept below an acceptable (possible predetermined) level.

The communication activity may be (at least partly) determined by reading the WLAN beacon signal. Typically, the beacon is sent every 100 ms and contains information about the load as well as the number of users (connected STAs). Alternatively or additionally, the radio frequency (RF) activity on the channel may be monitored. The load may be estimated based on the monitoring by determining the percentage of time the channel is occupied. The number of users may be estimated based on the monitoring by determining how many different RF power levels are detected.

The determination (based on load and number of users) of which channel is most suitable for UMTS LTE-A may be made in numerous different ways.

In one example scenario, suppose that two possible channels have been found. The first one of the channels is loaded to 90% with only one STA connected to the AP. The second one of the channels is loaded to 80% with 10 STAs connected to the AP. Judging from the load information, it seems better to use the second channel. However, there would still be 50% left for the WLAN STA of the first channel even if UMTS LTE were to occupy 50% of that channel, while filling up the usage to 100% of the second channel may have a devastating effect on the WLAN performance since the CSMA/CA algorithm runs into problems when the load approaches 100%. Thus, in this particular example it is probably better to use the first channel for UMTS LTE-A.

The restrictions that may be imposed on UMTS LTE-A may also take numerous different forms. The restrictions may, for example, concern to which extent the UMTS LTE-A communication should use the allocated channel, and how.

In the example above, where it is decided to use the first channel with 90% WLAN load and a single WLAN STA, it may be decided to let UMTS LTE-A use e.g. 40% of the radio resources in time. Then, the WLAN STA may use a little less than 60% since there will typically be some inefficiency loss so that exactly 100% cannot be achieved.

Another aspect that may be considered is how to schedule the 40%. If the periods of consecutive time allocated to the respective radio access technologies are small (e.g. lower than a first threshold) the overhead time (e.g. needed for switching between the radio access technologies) will be relatively large. On the other hand, if the periods of consecutive time are large (e.g. greater than a second threshold) the introduced delay for the currently non-allocated radio access technology will prevent applications with more stringent time requirements. Thus, a trade-off for the periods of consecutive time between the first and second threshold may be used.

If the channel has a large number of WLAN STAs, the situation may become even more delicate.

Since the CSMA/CA protocol faces some problems when the load approaches 100%, the UMTS LTE-A system should typically not allocate the channel so that 100% load is approached since this might cause congestion. As an example, UMTS LTE-A use of a channel may be limited so that the total load does not exceed 90%.

The selection of channel and the determination of UMTS LTE-A load to the channel may also take the number of detectable WLAN APs into account. For example, the selection may aim at selecting a channel used by as few WLAN APs as possible. Alternatively of additionally, the UMTS LTE-A load may be set inversely proportional to the number of WLAN APs. For instance, if M WLAN APs are identified, the UMTS LTE-A load may be set to $1/(1+M)$.

In one example application, fair sharing and minimizing delays may be balanced by scheduling UMTS LTE-A in cycles of 10 ms with 10 ms silent gaps in between if there is only one WLAN AP (M=1), and scheduling UMTS LTE-A in cycles of 5 ms with 15 ms silent gaps in between if there are 3 WLAN APs (M=3).

The selection of channel and the determination of UMTS LTE-A load to the channel may also take the number of UMTS LTE-A nodes (APs) into account in addition to the number of detectable WLAN APs. For example, the selection may aim at selecting a channel used by as few APs (WLAN plus UMTS LTE-A) as possible. Alternatively of additionally, the UMTS LTE-A load may be set inversely proportional to the number of APs. For instance, if M WLAN APs and N UMTS LTE-A APs are identified, the UMTS LTE-A load may be set to 1/(1+M+N).

The selection of channel and the determination of UMTS LTE-A load to the channel may also take the number of UMTS LTE-A operator IDs and the number of detectable WLAN network IDs into account. For example, the selection may aim at selecting a channel used by as few operator/network IDs (UMTS LTE-A and WLAN) as possible. Alternatively of additionally, the UMTS LTE-A load may be set inversely proportional to the number of operator/network IDs. For instance, if m WLAN network IDs and n UMTS LTE-A operator IDs are identified, the UMTS LTE-A load may be set to 1/(1+m+n).

In some embodiments, the selection and allocation of channels to UMTS LTE may comprise considering using both primary and secondary channels in some situations, to balance the usage for optimal (or at least acceptable) CSMA/CA function. For example, if UMTS LTE-A aims at high data rates both primary and secondary channels may be allocated (each to a low extent), while if UMTS LTE-A has high real time requirements only the secondary channel may be allocated (to a higher extent).

In some embodiments, UMTS LTE-A MAC (Media Access Control) features may be exploited to distribute logical channels for SCell. For example, if at least one SCell is set up using an unlicensed frequency band and at least one SCell is set up using a licensed frequency band one approach may consider moving logical channels (bearers) from un-licensed SCell to licensed SCell when the un-licensed performance degrades. This dynamic scheduling approach allows for faster allocation of channels.

If a cellular system is controlling an AP operating in the unlicensed band, the controlling node can configure the AP to operate as an UMTS LTE-A SCell or as a WLAN AP for optimal capacity and service usage depending on the current load in the cellular system and the available spectrum in the unlicensed band.

To conclude, embodiments disclosed herein enable improved coexistence between different radio access technology standards sharing the same un-licensed frequency band. Some examples illustrate how to select a channel to use for one of the radio access technologies. Some examples illustrate how the load to use for one of the radio access technologies may be determined so that the second radio access technology is not too severely affected.

Any reasonable combination of any of the embodiments and examples disclosed herein may also be considered.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a scheduler or a network node) comprising circuitry/logic or performing methods according to any of the embodiments. The electronic apparatus may, for example, be a base station, a base station controller, a computer, a USB-stick, a plug-in card, or an embedded drive.

Figure 6:
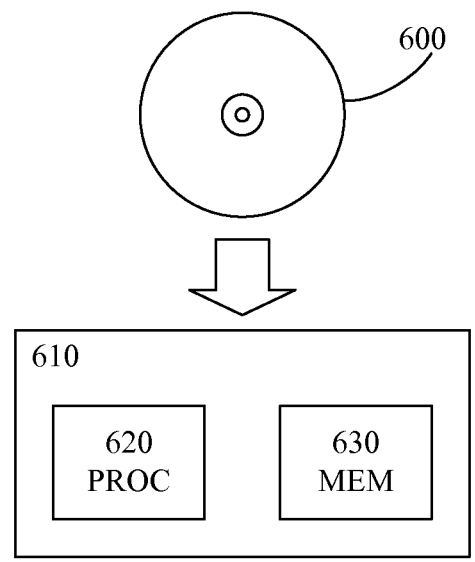
FIG. 6 is a schematic drawing illustrating a computer readable medium according to some embodiments.

According to some embodiments, a computer program product comprises a computer readable medium such as, for example, a diskette or a CD-ROM 600 as illustrated by FIG. 6. The computer readable medium may have stored thereon a computer program comprising program instructions. The computer program may be loadable into a data-processing unit (PROC) 620, which may, for example, be comprised in a network node 610. When loaded into the data-processing unit 620, the computer program may be stored in a memory (MEM) 630 associated with or integral to the data-processing unit 620. According to some embodiments, the computer program may, when loaded into and run by the data-processing unit, cause the data-processing unit to execute method steps according to, for example, the methods shown in any of the FIGS. 3 and 4.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The following comprises a few illustrative examples:

1. A method of a network node adapted to operate in accordance with a first radio access technology for allocation of radio resources of a frequency band to communication in accordance with the first radio access technology, wherein communication according to a second radio access technology may occupy one or more of the radio resources of the frequency band, the method comprising:
   receiving a beacon signal associated with the second radio access technology;
   determining whether or not the beacon signal comprises information indicative of which of the radio resources of the frequency band are used as primary and secondary channels, respectively, in accordance with the second radio access technology;
   determining a communication activity rate of at least one of the radio resources of the frequency band;
   selecting one or more of the radio resources of the frequency band based on the determined communication activity rate, wherein—if the beacon signal comprises information indicative of which of the radio resources of the frequency band are used as primary and secondary channels—the selection is further based on the information; and
   allocating one or more of the selected radio resources to communication in accordance with the first radio access technology.

2. The method of example 1 wherein selecting one or more of the radio resources comprises—if the beacon signal comprises information indicative of which of the radio resources of the frequency band are used as primary and secondary channels—selecting a radio resource used as secondary channel in accordance with the second radio access technology over a radio resource used as primary channel in accordance with the second radio access technology.

3. The method of any of examples 1 through 2 wherein the communication activity rate of a radio resource comprises one or more of a traffic load of the radio resource, a number of users of the radio resource, and whether or not the radio resource is currently used for communication.

4. The method of example 3 wherein selecting one or more of the radio resources comprises selecting a radio resource determined not to be currently used over a radio resource determined to be currently used.

5. The method of example 3 wherein selecting one or more of the radio resources comprises selecting a first radio resource over a second radio resource if a traffic load of the first radio resource is lower than a traffic load of the second radio resource.

6. The method of example 3 wherein selecting one or more of the radio resources comprises selecting a first radio resource over a second radio resource if a number of users of the first radio resource is lower than a number of users of the second radio resource.

7. The method of any of examples 1 through 6 wherein the first radio access technology is according to an Evolved Universal Terrestrial Radio Access—E-UTRA—and the second radio access technology is according to an IEEE—Institute of Electrical and Electronics Engineers—802.11 standard.

8. The method of any of examples 1 through 7 wherein the first radio access technology applies carrier aggregation and wherein the allocated radio resources of the frequency band are for secondary cell communication of the carrier aggregation.

9. The method of any of examples 1 through 8 wherein the frequency band is one of an unlicensed frequency band and a non-exclusively licensed frequency band.

10. A computer program product comprising a computer readable medium, having thereon a computer program comprising program instructions, the computer program being loadable into a data-processing unit and adapted to cause execution of the method according to any of examples 1 through 9 when the computer program is run by the data-processing unit.

11. A scheduler for a network node adapted to operate in accordance with a first radio access technology, for allocation of radio resources of a frequency band to communication in accordance with the first radio access technology, wherein communication according to a second radio access technology may occupy one or more of the radio resources of the frequency band, the scheduler adapted to:
determine whether or not a received beacon signal associated with the second radio access technology comprises information indicative of which of the radio resources of the frequency band are used as primary and secondary channels, respectively, in accordance with the second radio access technology;
determine a communication activity rate of at least one of the radio resources of the frequency band;
select one or more of the radio resources of the frequency band based on the determined communication activity rate, wherein—if the beacon signal comprises information indicative of which of the radio resources of the frequency band are used as primary and secondary channels—the selection is further based on the information; and
allocate one or more of the selected radio resources to communication in accordance with the first radio access technology.

12. The scheduler of example 11 wherein the scheduler comprises:
a determiner adapted to perform the determination of whether or not the received beacon signal associated with the second radio access technology comprises the information indicative of which of the radio resources of the frequency band are used as primary and secondary channels, respectively, in accordance with the second radio access technology;
a selector adapted to perform the selection of one or more of the radio resources of the frequency band; and
an allocator adapted to perform the allocation of one or more of the selected radio resources to communication in accordance with the first radio access technology.

13. The scheduler of any of examples 11 through 12 wherein the scheduler is adapted to—if the beacon signal comprises information indicative of which of the radio resources of the frequency band are used as primary and secondary channels—select a radio resource used as secondary channel in accordance with the second radio access technology over a radio resource used as primary channel in accordance with the second radio access technology.

14. A network node comprising the scheduler according to any of examples 11 through 13.

The invention claimed is:

1. A method, in a network node adapted to operate in accordance with a first radio access technology, for allocation of radio resources of a frequency band for communication in accordance with the first radio access technology, wherein communication according to a second radio access technology may occupy one or more of the radio resources of the frequency band, the method comprising:
receiving a beacon signal associated with the second radio access technology;
determining whether or not the beacon signal comprises information indicative of which of the radio resources of the frequency band are used as primary and secondary channels, respectively, in accordance with the second radio access technology;
determining a communication activity rate of at least one of the radio resources of the frequency band;
selecting one or more of the radio resources of the frequency band based on the determined communication activity rate, wherein, in the event that the beacon signal comprises information indicative of which of the radio resources of the frequency band are used as primary and secondary channels, the selection is further based on the information; and
allocating one or more of the selected radio resources to communication in accordance with the first radio access technology.

2. The method of claim 1, wherein selecting one or more of the radio resources comprises, in the event that the beacon signal comprises information indicative of which of the radio resources of the frequency band are used as primary and secondary channels, selecting a radio resource used as secondary channel in accordance with the second radio access technology over a radio resource used as primary channel in accordance with the second radio access technology.

3. The method of claim 1, wherein the communication activity rate of a radio resource comprises one or more of a traffic load of the radio resource, a number of users of the radio resource, and whether or not the radio resource is currently used for communication.

4. The method of claim 3, wherein selecting one or more of the radio resources comprises selecting a radio resource determined not to be currently used over a radio resource determined to be currently used.

5. The method of claim 3, wherein selecting one or more of the radio resources comprises selecting a first radio resource over a second radio resource if a traffic load of the first radio resource is lower than a traffic load of the second radio resource.

6. The method of claim 3, wherein selecting one or more of the radio resources comprises selecting a first radio resource over a second radio resource if a number of users of the first radio resource is lower than a number of users of the second radio resource.

7. The method of claim 1, wherein the first radio access technology is according to an Evolved Universal Terrestrial Radio Access (E-UTRA), and the second radio access technology is according to an Institute of Electrical and Electronics Engineers (IEEE) 802.11 standard.

8. The method of claim 1, wherein the first radio access technology applies carrier aggregation and wherein the allocated radio resources of the frequency band are for secondary cell communication of the carrier aggregation.

9. The method of claim 1, wherein the frequency band is one of an unlicensed frequency band and a non-exclusively licensed frequency band.

10. A non-transitory computer-readable medium having stored thereon a computer program comprising program instructions, the computer program being loadable into a data-processing unit in a network node adapted to operate in accordance with a first radio access technology, for allocation of radio resources of a frequency band for communication in accordance with the first radio access technology, wherein communication according to a second radio access technology may occupy one or more of the radio resources of the frequency band,
  receive a beacon signal associated with the second radio access technology;
  determine whether or not the beacon signal comprises information indicative of which of the radio resources of the frequency band are used as primary and secondary channels, respectively, in accordance with the second radio access technology;
  determine a communication activity rate of at least one of the radio resources of the frequency band;
  select one or more of the radio resources of the frequency band based on the determined communication activity rate, wherein, in the event that the beacon signal comprises information indicative of which of the radio resources of the frequency band are used as primary and secondary channels, the selection is further based on the information; and
  allocate one or more of the selected radio resources to communication in accordance with the first radio access technology.

11. A network node adapted to operate in accordance with a first radio access technology, for allocation of radio resources of a frequency band to communication in accordance with the first radio access technology, wherein communication according to a second radio access technology may occupy one or more of the radio resources of the frequency band, wherein the network node comprises:
  a processing circuit comprising a processor and an associated memory circuit storing computer program instructions for execution by the processor, wherein the processing circuit is configured to:
    determine whether or not a received beacon signal associated with the second radio access technology comprises information indicative of which of the radio resources of the frequency band are used as primary and secondary channels, respectively, in accordance with the second radio access technology;
    determine a communication activity rate of at least one of the radio resources of the frequency band;
    select one or more of the radio resources of the frequency band based on the determined communication activity rate, wherein, in the event that the beacon signal comprises information indicative of which of the radio resources of the frequency band are used as primary and secondary channels, the selection is further based on the information; and
    allocate one or more of the selected radio resources to communication in accordance with the first radio access technology.

12. The network node of claim 11, wherein the processing circuit is configured to, in the event that the beacon signal comprises information indicative of which of the radio resources of the frequency band are used as primary and secondary channels, select a radio resource used as secondary channel in accordance with the second radio access technology over a radio resource used as primary channel in accordance with the second radio access technology.

* * * * *